(12) United States Patent
Ly et al.

(10) Patent No.: US 10,310,209 B2
(45) Date of Patent: Jun. 4, 2019

(54) TIGHT-BUFFERED OPTICAL FIBER HAVING IMPROVED FIBER ACCESS (71) Applicant: OFS Fitel, LLC, Norcross, GA (US)

(72) Inventors: Heng Ly, Stone Mountain, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/086,137

(22) Filed: Mar. 31, 2016

(65) Prior Publication Data
US 2017/0285291 A1 Oct. 5, 2017

(51) Int. Cl.
G02B 6/44 (2006.01)
G02B 6/02 (2006.01)

(52) U.S. Cl.
CPC ....... *G02B 6/4495* (2013.01); *G02B 6/02395* (2013.01); *G02B 6/443* (2013.01)

(58) Field of Classification Search
CPC .................................. G02B 6/44; G02B 6/02
USPC .......................................................... 385/102
See application file for complete search history.

(56) References Cited

U.S. PATENT DOCUMENTS

| | | | | |
|---|---|---|---|---|
| 4,749,252 A * | 6/1988 | Yanagi | ................... | G02B 6/245 385/85 |
| 5,109,457 A * | 4/1992 | Panuska | ............... | G02B 6/4415 174/23 R |
| 5,210,812 A * | 5/1993 | Nilsson | ................ | G02B 6/2804 385/100 |
| 5,528,718 A * | 6/1996 | Ray | ........................ | B82Y 15/00 385/135 |
| 6,215,931 B1 * | 4/2001 | Risch | ................... | G02B 6/4429 385/109 |
| 6,421,487 B1 * | 7/2002 | Hutton | ................. | G02B 6/4404 385/114 |
| 6,512,869 B1 * | 1/2003 | Imayama | ............. | G02B 6/4495 385/114 |

(Continued)

FOREIGN PATENT DOCUMENTS

JP 1-93709 A 4/1989

OTHER PUBLICATIONS

Extended Search Report issued in European Application No. 17162758, dated Aug. 2, 2017, 9 pages.

(Continued)

*Primary Examiner* — Kaveh C Kianni
(74) *Attorney, Agent, or Firm* — Jim Hannan, Esq.; Eversheds-Sutherland (57) ABSTRACT

A tight-buffered optical fiber cable includes an improved method of accessing the coated optical fiber. The cable can include an optical fiber having a glass core and a cladding layer. One or more coating layers can be applied about the cladding layer. A buffer jacket material can be applied onto an outer surface of the outer coating layer as a buffer jacket outer layer. The buffer jacket outer layer can have distinctive features including a low tear strength, low elastic modulus, high elongation percentage, and low peeling force. This can allow a user of the optical fiber cable to separate at least a portion of the coated optical fiber from the buffer jacket outer layer by grasping a free end of the coated optical fiber and pulling it through the outer wall of the buffer jacket outer layer, thereby tearing through the outer wall of the buffer jacket outer layer.

8 Claims, 7 Drawing Sheets (56) References Cited

U.S. PATENT DOCUMENTS

| | | | |
|---|---|---|---|
| 7,193,155 B2* | 3/2007 | McMillan | H01B 7/361 174/112 |
| 7,330,621 B2* | 2/2008 | Elkins, II | G02B 6/2558 385/100 |
| 7,403,685 B2* | 7/2008 | Wells | G02B 6/4475 385/100 |
| 9,791,652 B2* | 10/2017 | Aguilar | G02B 6/441 |
| 2003/0095763 A1 | 5/2003 | Dallas et al. | |
| 2004/0086242 A1* | 5/2004 | McAlpine | G02B 6/4495 385/102 |
| 2004/0120665 A1* | 6/2004 | Hurley | G02B 6/441 385/106 |
| 2004/0197059 A1* | 10/2004 | Castellani | C08L 23/10 385/113 |
| 2005/0063650 A1* | 3/2005 | Castellani | C08L 23/16 385/100 |
| 2005/0169587 A1* | 8/2005 | Tatat | G02B 6/4494 385/100 |
| 2006/0104579 A1* | 5/2006 | Fitz | G02B 6/4434 385/103 |
| 2006/0179651 A1* | 8/2006 | Kachmar | G02B 6/4486 29/825 |
| 2007/0212005 A1* | 9/2007 | Lu | G02B 6/4475 385/100 |
| 2007/0212009 A1* | 9/2007 | Lu | G02B 6/4472 385/135 |
| 2008/0304798 A1* | 12/2008 | Pavan | C08L 23/0869 385/110 |
| 2010/0254668 A1 | 10/2010 | Consonni et al. | |
| 2011/0170836 A1 | 7/2011 | Consonni et al. | |
| 2011/0217010 A1* | 9/2011 | Kachmar | G02B 6/4433 385/111 |
| 2012/0063731 A1* | 3/2012 | Fitz | G02B 6/4495 385/104 |
| 2012/0257864 A1* | 10/2012 | Consonni | G02B 6/441 385/112 |
| 2013/0287346 A1 | 10/2013 | Gimblet et al. | |
| 2014/0331779 A1* | 11/2014 | Hurley | G01L 1/242 73/800 |
| 2015/0253526 A1* | 9/2015 | Sandate Aguilar | G02B 6/441 385/103 |
| 2015/0310964 A1* | 10/2015 | Larson | G02B 6/441 174/71 R |
| 2016/0299306 A1* | 10/2016 | McAlpine | G02B 6/4413 |
| 2017/0146756 A1* | 5/2017 | Baca | G02B 6/443 |

OTHER PUBLICATIONS

Office Action issued in Japanese Application No. 2017-060375, May 24, 2018, 9 pages.

* cited by examiner

TIGHT-BUFFERED OPTICAL FIBER HAVING IMPROVED FIBER ACCESS

TECHNOLOGICAL FIELD

This invention generally relates to optical fiber, and more specifically, to optical fiber having a tight-buffered jacket material that is capable of being torn in a ripcord fashion down a longitudinal axis of the jacket material.

BACKGROUND

Optical glass fibers typically include a waveguide formed by a central core surrounded by a cladding material. The core and cladding are usually coated with at least one additional layer to help protect the delicate waveguide during handling and to shield the waveguide against external stresses that may cause microbend losses, etc. A common configuration is to directly coat the cladding with a relatively soft "primary" coating, and then apply a harder "secondary" coating onto the primary coating. Coloration to identify the fiber may be applied, either by incorporating colorants in the secondary coating or applying a very thin coating of an ink over the secondary coating.

In some cases, an additional protective outer coating referred to as a buffer jacket material is applied over the secondary coating. In certain situations, the buffer jacket material is made of a thermoplastic material, for example polyvinyl chloride (PVC), polyethylene, or nylon. In some situations, the buffer jacket material is made of an ultraviolet (UV) curable polyacrylate. The buffer jacket outer layer can be configured to provide desired mechanical protection to the core and cladding. For example, conventional buffer jacket outer layers may be relatively soft to help cushion the core and cladding from external stresses or relatively harder to help protect the core and cladding layer and to effectively shield the optical fiber from certain external forces and stresses. This buffer coating may also improve the ergonomics of handling the relatively delicate optical fiber in the field by providing a larger, more robust structure for installers to handle.

The protective buffer jacket outer layer may be applied on the coated optical fiber to create a "semi-tight buffer optical fiber" or a "tight-buffer optical fiber." While the buffer jacket outer layer provides protection to the optical fiber, at least a portion of the buffer jacket outer layer must be removed in order to terminate the optical fiber and put it in use. One such method is to remove a small section of the tight buffer to terminate the optical fiber in an optical connector. Another method is to remove long lengths of the tight buffer in order to terminate the fiber by fusion splicing. In many situations, an installer of optical fiber may need to remove all of the buffer jacket outer layer for up to one linear meter of the optical fiber in order to properly terminate the optical fiber, while leaving the primary and secondary coating layer on the optical fiber. Removing up to one linear meter of the buffer jacket outer layer can be difficult because conventional buffer jacket outer layers are not designed to be peeled off the coating layer of the coated optical fiber. This means the installer will have to slide the buffer jacket outer layer off of the coating layers of the coated optical fiber. This can be difficult if the buffer jacket outer layer does not slide easily along the coating layer of the coated optical fiber.

Figure 1:
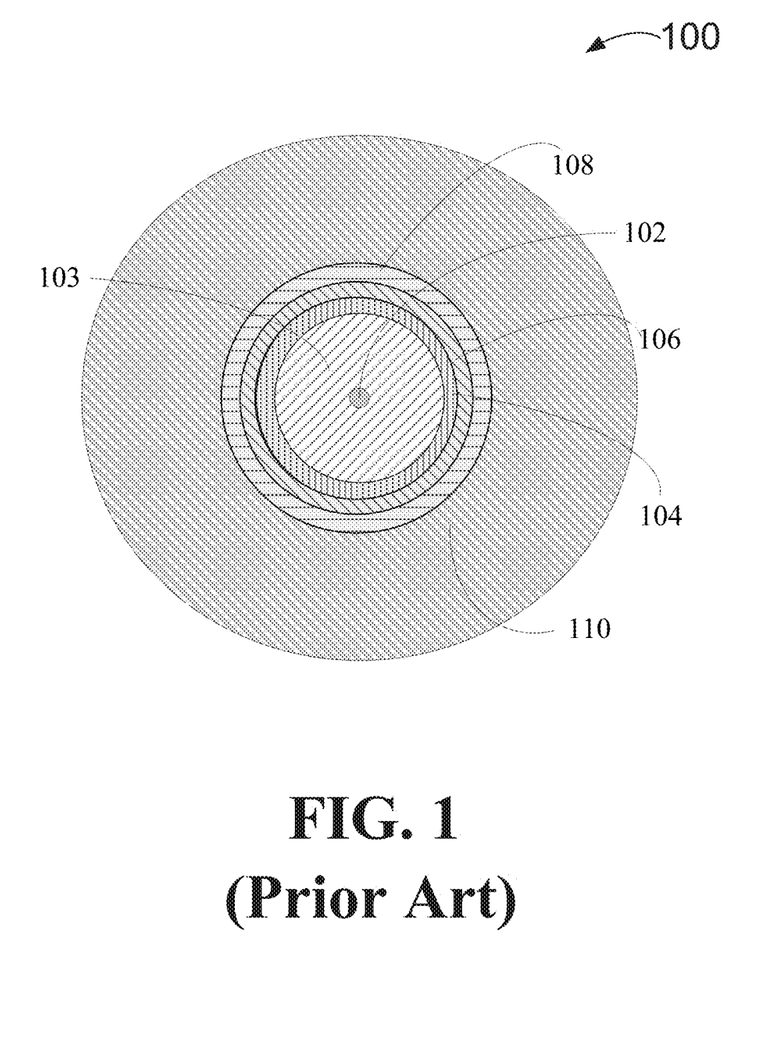
FIG. 1 is a cross-sectional view of a conventional tight-buffered optical fiber.

In order to improve the ability for an installer to remove the buffer jacket outer layer from the coated optical fiber, one form of tight-buffer optical fiber may include a substantial void filled with an additional material between the coated optical fiber and the buffer jacket outer layer. FIG. 1 presents one common version of a conventional tight-buffered optical fiber 100. As shown in FIG. 1, the tight-buffered optical fiber 100 can include an optical fiber having a central core 102. The central core 102 can be surrounded by cladding material 103 that has a generally circular cross-section. The conventional tight-buffered optical fiber can also include one or more of a primary coating layer 104 surrounding the cladding material 103, a secondary coating layer 106 surrounding the primary coating layer 104 and a tertiary coating layer (not shown) surrounding the secondary coating layer 106, which may be collectively referred to herein as a "coating layer 106". The central core 102, the cladding material 103, and the coating layer 106 make up the optical fiber. In certain examples, the primary coating layer 104 can be relatively soft while the secondary coating layer can be relatively hard. The coating layer may be colored or colorless. For example, in conventional embodiments where the coating layer includes a primary coating layer 104 and a secondary coating layer 106, the secondary coating layer may be colored. In other conventional embodiments, the primary coating layer 104 and the secondary coating layer 106 are colorless and the tertiary layer is a thin ink layer covering the secondary coating and providing a color thereto. A slip layer 108 can be applied around an exterior of the coating layer 106 (e.g., the secondary coating layer 106 or ink layer). The slip layer 108 can act as a lubricant between the coating layer 106 and the inner surface of the buffer jacket outer layer 110 (e.g., between the secondary coating layer 106 or ink layer (if applied) and the buffer jacket outer layer 110). The slip layer 108 can be an oil-based filling compound or gel. Examples of the materials used for the slip layer 108 include lubricants, such as silicone oil, thixotropic materials and acrylate material.

However, the use of slip layers 108 to provide an improved mechanism for removing the buffer jacket outer layer 110 from at least a portion of the optical fiber 100 can have several drawbacks. First, to apply the slip layer 108 requires an additional step in the manufacturing process for the optical fiber 100. This additional step is needed in order to apply the slip layer 108 to the outer surface of the coating layer 106 (e.g., the secondary coating layer 106 or ink layer). The additional manufacturing step results in additional costs and additional time to manufacture the tight-buffered optical fiber 100. In addition, once a user removes the buffer jacket outer layer 110 from the optical fiber 100, the user must then attempt to clean off the oil, gel, or other wet filling compound that remains on the outer surface of the coating layer 106 (e.g., the secondary coating layer 106 or ink layer) before the user can terminate the optical fiber 100 for use. This cleaning process can be time-consuming and, in many cases, it can be very difficult to remove a sufficient amount of the slip layer material 108 from the outer surface of the coating layer 106 (e.g., the secondary coating layer 106 or ink layer).

Another example of conventional tight-buffered optical fibers includes an optical fiber having a central core 102 and cladding material 103 surrounding an outer surface of the central core 102. The optical fiber may also include one or more of a primary coating layer 104 surrounding the cladding material 103, a secondary coating layer 106 surrounding the primary coating layer 104 and an optional tertiary coating layer (not shown) surrounding the secondary coating layer 106 (collectively the "coating layer 106"), The outer surface of the coating layer 106 may then be surrounded by a buffer jacket outer layer that is made from a thermoset acrylate prepolymer generally cured using ultraviolet (UV)

radiation. If it is desirable to easily remove long lengths of an acrylate buffer jacket outer layer, additives may be incorporated into the formulation of the buffer jacket outer layer prepolymer to increase the slip capability of the cured buffer jacket outer layer against the coated fiber surface (e.g., the outer surface of the secondary coating layer 106). Unfortunately, this conventional design of an easily removable buffer outer layer also has drawbacks. The use of such slip additives in the buffer jacket outer layer can cause the optical fiber to experience high optical attenuations. High optical attenuations in the optical fiber are not desirable and can occur most frequently during cold weather. The coefficient of thermal expansion of the cured acrylate buffer jacket coating is generally significantly higher than that of the secondary-coated optical fiber. When no slip additive is used, the optical fiber is well-coupled to the buffer jacket outer coating and forms a composite where the buffer jacket outer coating cannot shrink relative to the fiber. However, when a slip additive is used, the buffer jacket outer coating can shrink relative to the secondary coated optical fiber, forcing the fiber to bend and resulting in signal attenuation.

Figure 2:
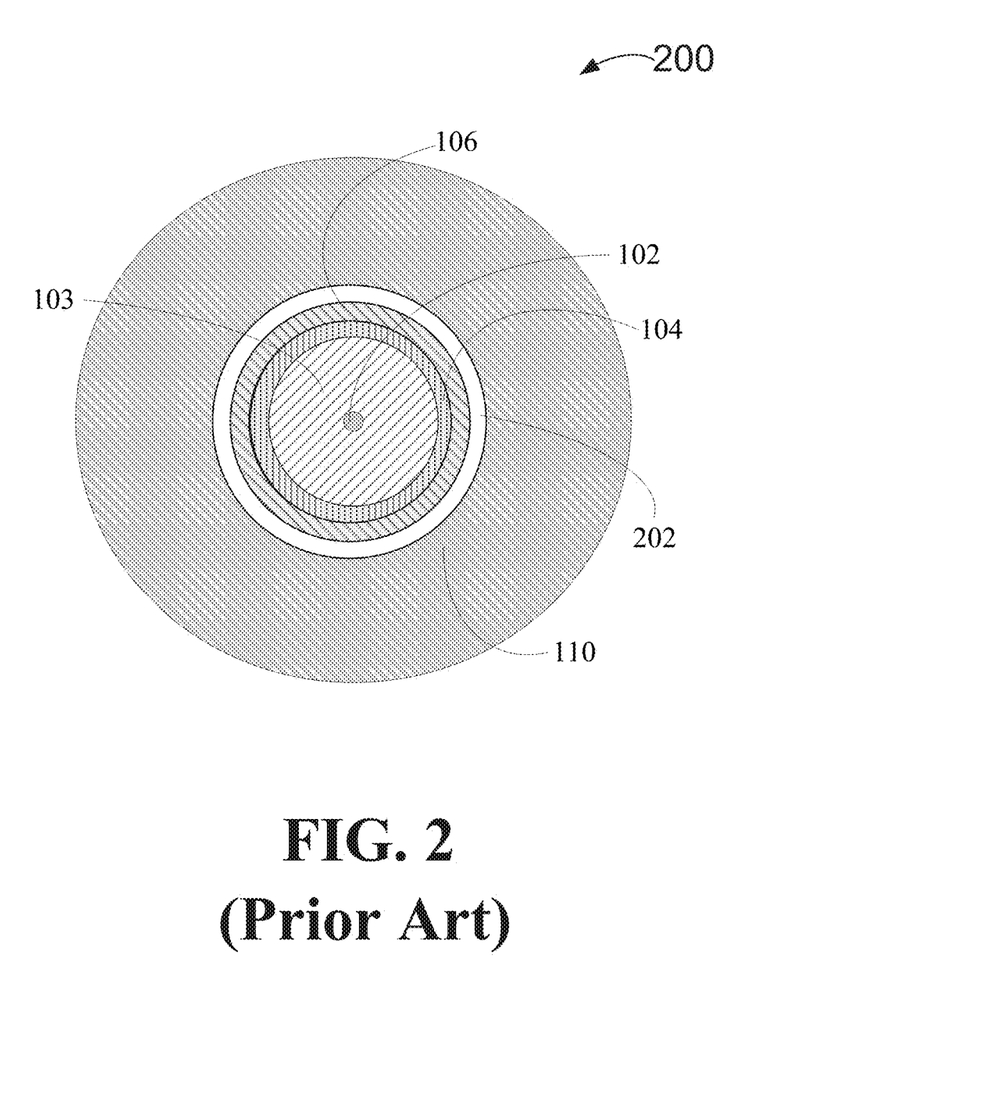
FIG. 2 is a cross-sectional view of a conventional semi-tight buffered optical fiber.

In order to overcome some of the issues of conventional tight-buffered optical fibers, some manufacturers have developed semi-tight buffered optical fibers. FIG. 2 presents one common version of a conventional semi-tight buffered optical fiber 200. As shown in FIG. 2, the semi-tight buffered optical fiber 200 includes an optical fiber having a central core 102. The central core 102 is surrounded by cladding material 103, which has a generally circular cross-section just as that described with regard to the tight-buffered optical fiber of FIG. 1. The conventional tight-buffered optical fiber can also include one or more of a primary coating layer 104 surrounding the cladding material 103, a secondary coating layer 106 surrounding the primary coating layer 104 and a tertiary coating layer (not shown) surrounding the secondary coating layer 106, which may be collectively referred to herein as a "coating layer 106". In certain examples, the primary coating layer 104 can be relatively soft while the secondary coating layer can be relatively hard. The coating layer may be colored or colorless. For example, in conventional embodiments where the coating layer includes a primary coating layer 104 and a secondary coating layer 106, the secondary coating layer may be colored. In other conventional embodiments, the primary coating layer 104 and the secondary coating layer 106 are colorless and the tertiary layer is a thin ink layer covering the secondary coating and providing a color thereto. The coating layer 106, core 102, and cladding layer 103 are collectively referred to herein as a "coated optical fiber". An air gap 202 can be provided for around an exterior of the coated optical fiber (e.g., around the exterior of the secondary coating layer 106) between the outer surface of the coating layer 106 (e.g., the outer surface of the secondary coating layer 106 or ink layer) and the inner surface of the buffer jacket outer layer 110. The air gap 202 can provide sufficient spacing to permit the buffer jacket outer layer 110 to slide along the outer surface of the coating layer 106 of the coated optical fiber and be removed from the coated optical fiber 200.

However, the use of an air gap 202 to provide an improved mechanism for removing the buffer jacket outer layer 110 from at least a portion of the optical fiber 200 also has drawbacks. For example, the ability of the coated optical fiber 102, 103, 104, 106 to move around inside of the buffer jacket outer layer 110 can result in the coated optical fiber experiencing high optical attenuations. These high optical attenuations can be most significant when the coated optical fiber is used in an area of cold weather due to the shrinkage of the buffer jacket outer layer relative to the secondary coating layer 106. In addition, the manufacturing process for semi-tight buffered optical fibers 200 can be more challenging as it can be difficult to maintain a constant or substantially constant air gap spacing between the outer surface of the coated optical fiber (e.g., the outer surface of the secondary coating layer 106 or ink layer) and an inner surface of the buffer jacket outer layer 110.

BRIEF DESCRIPTION OF THE FIGURES

Reference will now be made to the accompanying tables and drawings, which are not necessarily drawn to scale, and wherein.

DETAILED DESCRIPTION OF EXAMPLE EMBODIMENTS

Example embodiments of the disclosure will be described more fully hereinafter with reference to the accompanying drawings, in which embodiments of the disclosure are shown. This concepts embodied by the example embodiment discussed herein may, however, be embodied in many different forms and should not be construed as limited to the example embodiments set forth herein. Rather, these example embodiments are provided so that this disclosure will be thorough and complete, and will fully convey the scope of the concepts to those skilled in the art. Like numbers refer to like, but not necessarily the same, elements throughout.

In addition, certain relationships between dimensions of the tight-buffered optical fiber and between features of the tight-buffered optical fiber are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions.

Certain embodiments of the disclosure may enable making or providing a tight-buffered optical fiber with a buffer jacket outer layer that is capable of being removed from the coated optical fiber by tearing the coated optical fiber through the wall of the buffer jacket outer layer. According to certain example embodiments, the buffer jacket outer layer is provided with certain operational characteristics that allow the buffer jacket outer layer to provide protection to the coated optical fiber when intact and also allows the coated optical fiber to pass or slice through the buffer jacket outer layer when pulled along the longitudinal axis of the buffer jacket outer layer to easily and quickly remove the buffer jacket outer layer from the coated optical fiber. This method of removing the buffer jacket outer layer from the coated optical fiber is a departure from previous methods where the buffer jacket outer layer was cut along a portion of the coated optical fiber cable and then slid off of the coated optical fiber.

According to certain example embodiments of the disclosure, by providing a buffer jacket outer layer that includes a low tear strength, a high elongation and a low elastic modulus and applying the buffer jacket outer layer to a coated optical fiber in a tight-buffered configuration, an optical fiber cable is provided with an ability to remove the buffer jacket outer layer from the coated optical fiber by gripping the coated optical fiber near a terminating point and pulling the coated optical fiber through the buffer jacket outer layer and tearing through the buffer jacket outer layer in order to remove any desired length of the buffer jacket outer layer from the optical fiber cable. In addition, the example embodiments of the disclosure do not require the use of additional slip layers, filling compounds, or air gaps to provide for or enhance the removability of the buffer jacket outer layer from the coated optical fiber.

Various apparatuses and methods for making and using the tight-buffered optical fiber cable, according to example embodiments of the disclosure, will now be described with reference to the accompanying figures.

Figure 3:
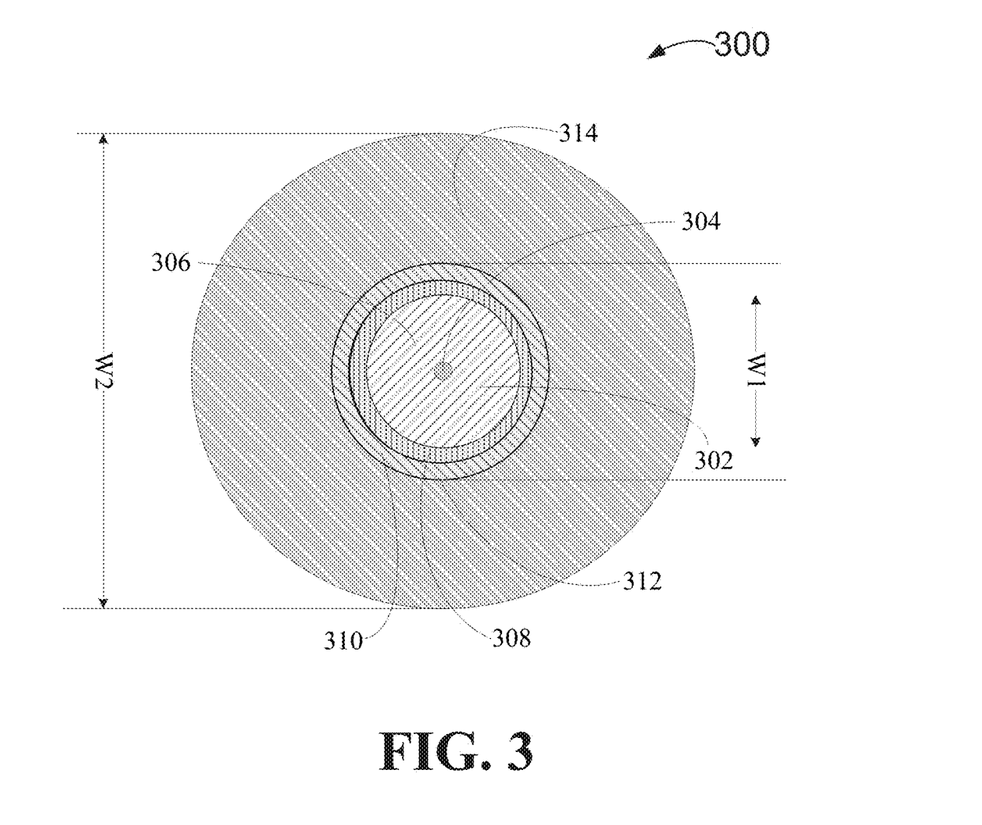
FIG. 3 is a cross-sectional view of a tight-buffered optical fiber in accordance with one example embodiment of the disclosure.

FIG. 3 illustrates an example cross-sectional view of an illustrative tight-buffered optical fiber cable 300, according to one example embodiment of the disclosure. Referring now to FIG. 3, the example tight-buffered optical fiber cable 300 can include a core 304, and a cladding layer 306 surrounding the core 304. The tight-buffered optical fiber 300 can also include one or more of a primary coating layer 308 surrounding the cladding layer 306, a secondary coating layer 310 surrounding the primary coating layer 308 and optionally a tertiary coating layer (not shown) surrounding the secondary coating layer 310, which may be collectively referred to herein as a "coating layer 312". In certain examples, the primary coating layer 308 can be relatively soft while the secondary coating layer 310 can be relatively hard. The coating layer 312 may be colored or colorless. For example, in example embodiments where the coating layer includes a primary coating layer 308 and a secondary coating layer 310, the secondary coating layer 310 may be colored. In other example embodiments, the primary coating layer 308 and the secondary coating layer 310 are colorless and the tertiary layer is a thin ink layer covering the secondary coating layer 310 and providing a color thereto. The coating layer 312, core 304, and cladding layer 306 are collectively referred to herein as a "coated optical fiber 302". According to certain example embodiments, the resulting coated optical fiber 302 may have a diameter W1 of up to 250 microns. In other example embodiments, the diameter W1 of the coated optical fiber 302 may be greater than 250 microns. In other example embodiments, the diameter W1 of the coated optical fiber 302 may be less than 250 microns.

According to certain example embodiments, the outer surface of the coated optical fiber 302 (e.g., the outer surface of the coating layer 312 (e.g., the outer surface of the secondary coating layer 310 or ink layer)) can be further surrounded by a buffer jacket outer layer 314. In one example embodiment, the buffer jacket outer layer 314 includes a UV-curable polyurethane acrylate. In this example embodiment, the polyurethane acrylate for the buffer jacket outer layer 314 can be ESB.10V3 manufactured by Nor-Cote International, Inc. The buffer jacket outer layer 314 is strippable from the coated optical fiber 302. The buffer jacket outer layer 314 can be applied directly against (e.g., in intimate contact with) the outer surface of the coated optical fiber 302 (e.g., the outer surface of the secondary coating layer 310 or ink layer) to create a tight-buffered optical fiber cable 300.

In certain example embodiments, the buffer jacket outer layer 314 can have a low elastic modulus. For example, the buffer jacket outer layer 314 can have an elastic modulus of between substantially 20 megapascals (MPa) to substantially 90 MPa, and more preferably between substantially 30 MPa to substantially 80 MPa, and more preferably between substantially 45 MPa to substantially 75 MPa, and more preferably between substantially 50 MPa to substantially 70 MPa, and more preferably between substantially 55 MPa to substantially 65 MPA, and more preferably substantially 60 MPa.

In addition, or alternatively, the buffer jacket outer layer 314 can have a high elongation. For example, the buffer jacket outer layer 314 can have an elongation of between substantially 20% to substantially 80%, and more preferably between substantially 30% to substantially 70%, and more preferably between substantially 40% to substantially 60% and more preferably between substantially 45% to substantially 55%, and more preferably substantially 50%.

In addition, or alternatively, the buffer jacket outer layer 314 can have a low tensile or tear strength. For example, the buffer jacket outer layer 314 can have a tensile strength of between substantially 1 MPa to substantially 20 MPa, and more preferably between substantially 1 MPa to substantially 15 MPA, and more preferably between substantially 1 MPa to substantially 10 MPa, and more preferably between substantially 3 MPa to substantially 8 MPa and more preferably substantially 6 MPa.

According to certain example embodiments, the resulting tight-buffered optical fiber cable 300 may have a diameter W2 of up to substantially 900 microns. In other example embodiments, the diameter W2 of the tight-buffered optical fiber cable 300 may be greater than 900 microns. In other example embodiments, the diameter W2 of the tight-buffered optical fiber cable 300 may be less than 900 microns. For example, the diameter W2 of the tight-buffered optical fiber cable 300 may be substantially 500 microns or substantially 600 microns.

Figure 4:
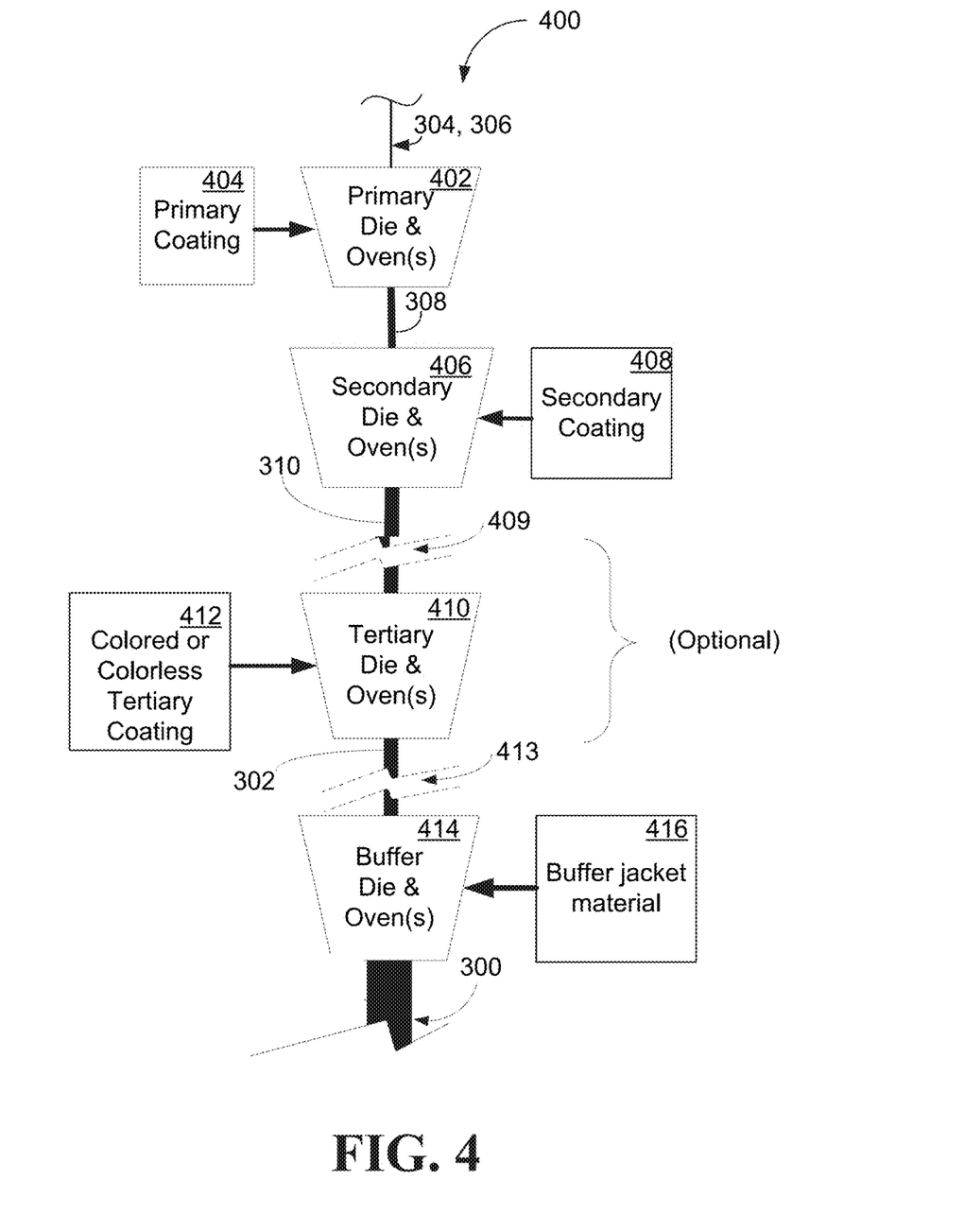
FIG. 4 is a block diagram of an example system for making tight-buffered optical fiber in accordance with one example embodiment of the disclosure.

FIG. 4 is a block diagram of an example coating system 400 for making the example tight-buffered optical fiber 300 of FIG. 3 in accordance with one example embodiment of the disclosure. Referring now to FIGS. 3 and 4, the example method 400 can include a drawn glass optical fiber core 304 surrounded with a cladding layer 306. The glass optical fiber core 304 and cladding layer 306 may enter a coating process for applying one or more coating layers and buffer jacket outer layer. For example, the optical fiber core 304 and cladding layer 306 can enter the primary die 402, where the outer surface of the cladding layer 306 can be coated with a primary coating layer material 404 upon passing through the primary die 402. In one example, the optical fiber cable 300 having a fiber core 304, cladding layer 306, and primary coating layer 308 may be cured in one or more UV ovens 402 as part of the primary coating layer process.

The coating process may then continue with the optical fiber cable 300 having the fiber core 304, cladding layer 306 and primary coating layer 308 passing through a secondary die 406, where the outer surface of the primary coating layer 308 is coated with a secondary coating layer material 408. In certain example embodiments, the secondary coating layer 310 can be colored or colorless. In one example, the optical fiber cable 300 having a fiber core 304, cladding layer 306, primary coating layer 308, and second coating layer 310 may be cured in one or more UV ovens 406 as part of the secondary coating layer process. In one example, the optical fiber cable 300 having a fiber core 304, cladding layer 306, primary coating layer 308, and second coating layer 310 may be spooled 409 for later processing. The optical fiber cable 300 can optionally go through an additional process where a colored or colorless tertiary coating layer 412 can be applied to an outer surface of the secondary coating layer 310. In one example, the optical fiber cable 300 having a fiber core 304, cladding layer 306, primary coating layer 308, second coating layer 310, and a tertiary coating layer 412 may be cured in one or more UV ovens 410 as part of the tertiary coating layer process. The optical fiber cable 300 having a fiber core 304, cladding layer 306, primary coating layer 308, second coating layer 310, and a tertiary coating layer 412 may be spooled 413 for later processing.

The coated optical fiber 302 including the fiber core 304, cladding layer 306, and one or more of the primary coating layer 308, secondary coating layer 310 and tertiary coating layer or ink layer, may subsequently proceed to a buffer jacket outer layer coating process that includes a buffer jacket material 416 and buffer die and UV oven(s) 414. In one example embodiment, ultraviolet curable acrylate-based buffer jacket material 416 may be applied to an outer surface of the coated optical fiber 302 (e.g., an outer surface of the secondary coating layer, an outer surface of the ink (tertiary) layer, etc.) at the buffer jacket die 414. In one example, the buffer material 416 is a polyurethane acrylate. For example, the buffer jacket material 416 can be ESB.10V3 manufactured by Nor-Cote International, Inc. and can have a low tear strength, high elongation percentage and low elastic modulus as described above with reference to FIG. 3. According to certain example embodiments, the coated optical fiber 302 coated with the buffer jacket outer layer 314 may exit the buffer jacket coating die and may enter one or more UV curing ovens 414. After the buffer jacket outer layer 314 has been cured onto the coated optical fiber 302, the tight-buffered optical fiber cable 300 may be taken up and spooled as final product.

Figure 5:
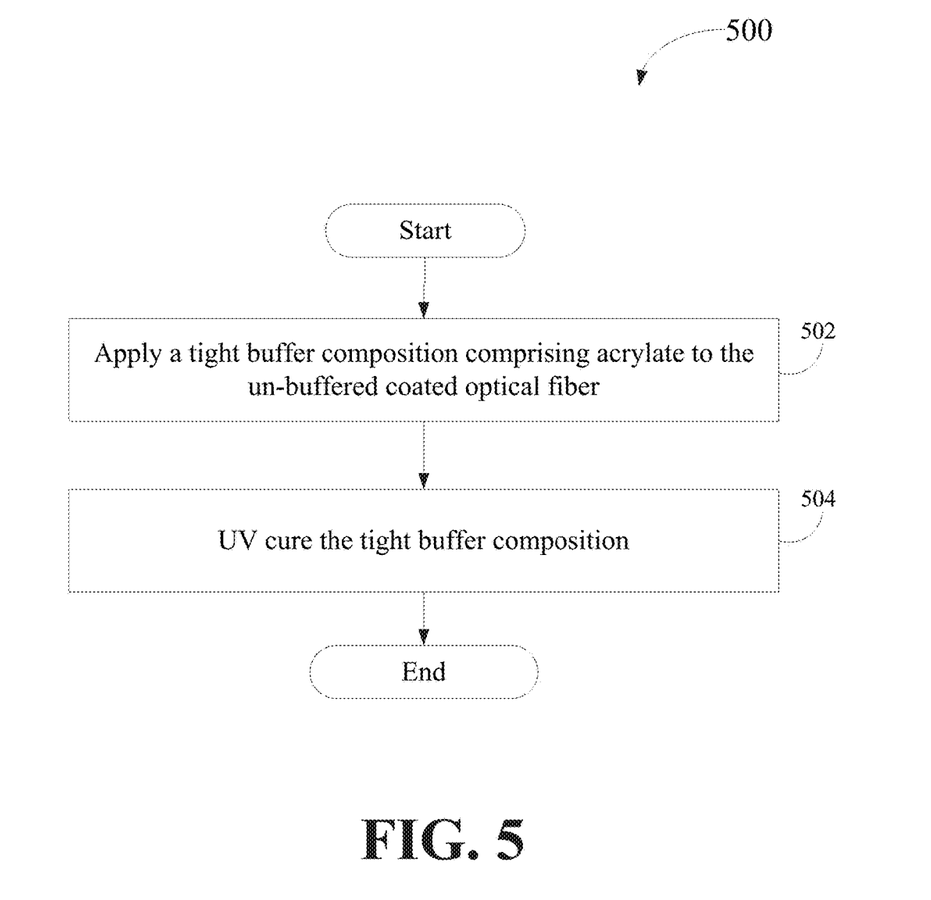
FIG. 5 is a flow diagram of an example method for manufacturing the tight-buffered optical fiber in accordance with one example embodiment of the disclosure.

FIG. 5 is a flow diagram of an example method 500 for manufacturing the tight-buffered optical fiber cable 300 in accordance with one example embodiment of the disclosure. Now referring to FIGS. 3-5, the example method 500 for making a tight-buffered optical fiber cable 300 with a buffer jacket outer layer 314 having a low tear strength, high elongation percentage and low elastic modulus, as discussed above, and providing a predetermined buffer jacket outer layer peeling force starts at block 502. At step 502 a buffer jacket outer layer 308, that includes a UV-curable polyurethane acrylate that when cured has a low tear strength, high elongation percentage and low elastic modulus, is applied, at for example a buffer jacket die 414, in a tight buffer composition to an outer surface of the coated optical fiber 302 (e.g., an outer surface of the secondary coating layer 310, an outer surface of an ink layer, etc.). In block 504, the buffer jacket outer layer 314 is cured in, for example, one or more UV ovens 414. The tight-buffered optical fiber cable 300 can then be taken up and spooled as final product and the method can proceed to the END step.

Figure 6:
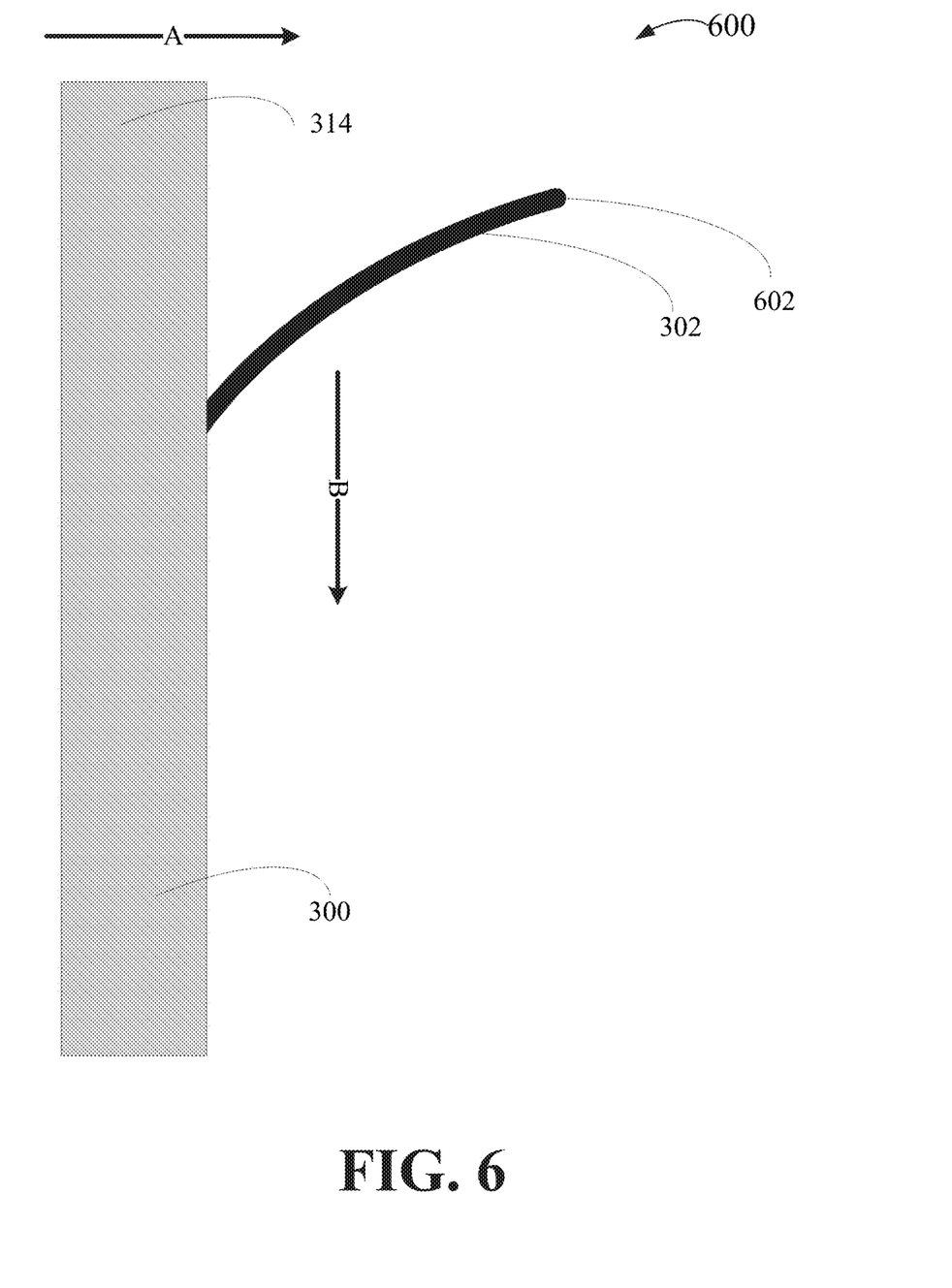
FIG. 6 presents an example method for removing a buffer jacket outer layer from an optical fiber by tearing the optical fiber through the buffer jacket outer layer in accordance with one example embodiment of the disclosure.

FIG. 6 is a depiction of an example method for removing a buffer jacket outer layer 314 from an optical fiber cable 300 by tearing the coated optical fiber 302 through the wall of the buffer jacket outer layer 314 in accordance with one example embodiment of the disclosure. Now referring to FIG. 6, an installer or other person can grip the coated optical fiber 302 at or adjacent a terminating end 602 of the coated optical fiber 302. At this point in time, the surrounding wall of the buffer jacket outer layer 314 that surrounds the coated optical fiber 302 can be intact. The installer or other person may then pull the coated optical fiber 302 substantially in the "A" direction against a portion of the outer wall of the buffer jacket outer layer 314 until the coated optical fiber 302 breaks through the outer wall of the buffer jacket outer layer 314. The installer or other person may then continue pulling the coated optical fiber 302 in the "B" direction and/or in any combination of the "A" and "B" directions to remove the coated optical fiber 302 from the buffer jacket outer layer 314. The installer or other person can continue to remove the coated optical fiber 302 from the buffer jacket outer layer 314 in this "ripcord" procedure until enough of the coated optical fiber 302 is exposed. The installer or other person can then simply cut off, pinch off, or otherwise break off the portion of the buffer jacket outer layer 314 that is no longer surrounding the coated optical fiber 302.

According to certain example embodiments, the buffer jacket outer layer 314 can be removed from the coated optical fiber 302 by pulling or tearing the coated optical fiber 302 through the buffer jacket outer layer 314 with a peeling force in the range of substantially 5 grams to substantially 50 grams, and more preferably in the range of substantially 10 grams to substantially 30 grams, and more preferably substantially 10 grams to substantially 20 grams.

Figure 7:
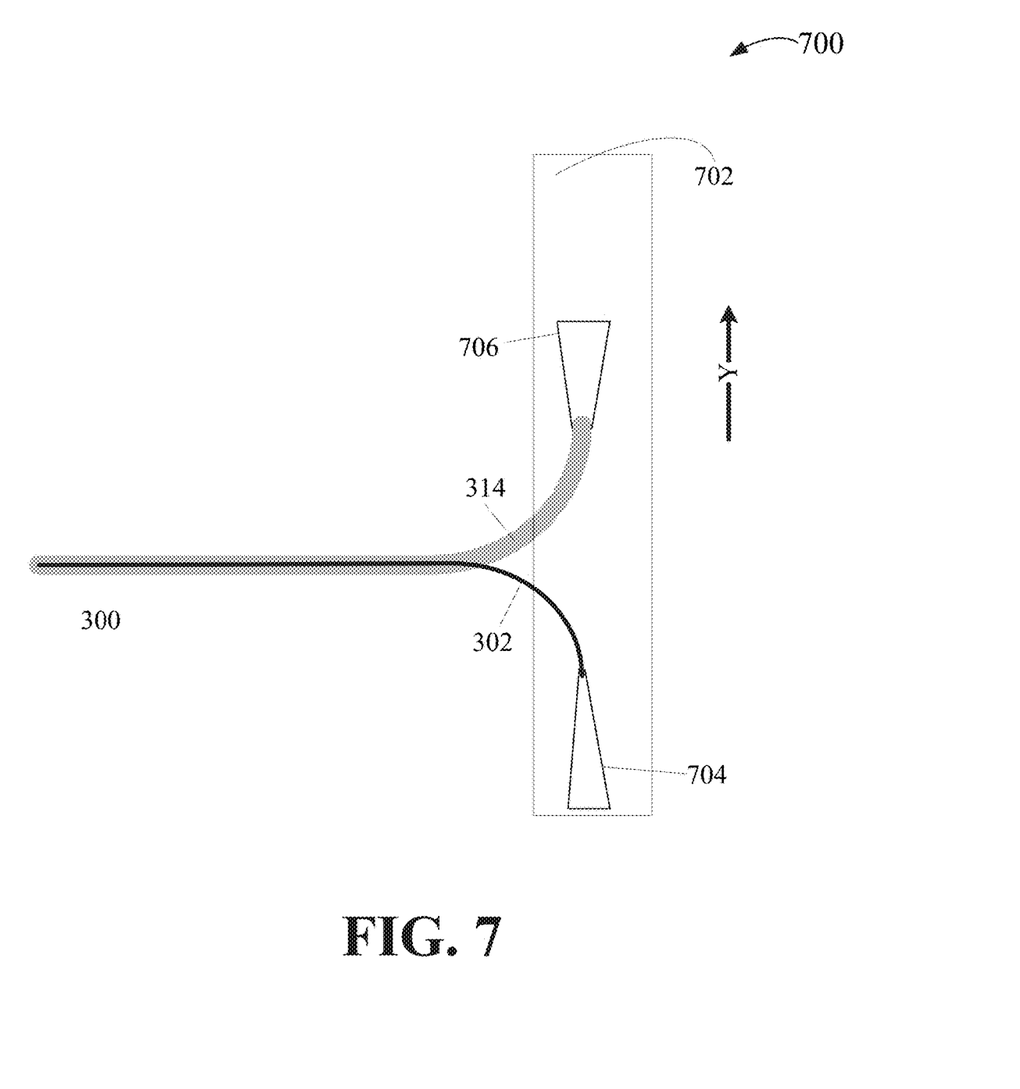
FIG. 7 is an example system for testing the peeling force to remove the optical fiber from the buffer jacket outer layer in accordance with one example embodiment of the disclosure.

FIG. 7 is an example system 700 for identifying the peeling force to remove the coated optical fiber 302 from the buffer jacket outer layer 314 in accordance with one example embodiment of the disclosure. Referring now to FIGS. 3 and 7, the example system 700 can include a peel force testing machine 702. An example of a suitable peel force testing matching is the INSTRON® Model 5965 Universal Testing Machine manufactured by Illinois Tool Works, Inc. The peel force testing machine 702 can include a fixed cross-head clamp 704 and a moving cross-head clamp 706. In one example, the fixed cross-head clamp 704 does not move or remains static while the moving cross-head clamp 706 is capable of being moved towards and away from the fixed cross-head clamp 704.

To conduct the peel force test, a sample of the tight-buffered optical fiber cable 300 can be selected. In certain example embodiments, the sample of the optical fiber cable 300 can be twelve inches in length. Alternatively, the sample optical fiber cable 300 can be greater or lesser than twelve inches in length. The sample optical fiber cable 300 can have a first end and a distal second end. A portion of the buffer jacket outer layer 314 can be removed from the first end of the optical fiber cable 300 to expose a portion of the coated optical fiber 302. In one example, about one inch of buffer jacket outer layer 314 can be removed from the first end of the optical fiber cable 300, thereby exposing about one inch of the coated optical fiber 302. A portion of the first end of the coated optical fiber 302 can be coupled to or otherwise placed into the fixed cross-head clamp 704 and held in place. The first end of the buffer jacket outer layer 314 can be coupled to or otherwise placed into the moving cross-head clamp 706. At the start of the test, the distance between the fixed cross-head clamp 704 and moving cross-head clamp 706 can be about two inches or less. The moving cross-head clamp 706 can then be moved in the "Y" direction away from the fixed cross-head clamp 704. In one example, the moving cross-head clamp 706 can move at substantially three inches per minute. The peel force testing machine 702 can measure and record the maximum peeling force to remove the coated optical fiber 302 from the buffer jacket outer layer 314 as the moving cross-head clamp 706 moves away from the fixed cross-head clamp 704. In one example embodiment, the moving cross-head clamp 706 moves between three and four inches and tears out between three and four inches of coated optical fiber 302 through the outer wall of the buffer jacket outer layer 314 during the test.

The results of the peel force test using the buffer jacket material for the buffer jacket outer layer 314 that includes polyurethane acrylate, such as ESB.10V3 polyurethane acrylate manufactured by Nor-Cote International, Inc. with a low tear strength, high elongation percentage and low elastic modulus as described above in FIG. 3, results in a peeling force in the range of substantially 5 grams to substantially 50 grams, and more preferably in the range of substantially 10 grams to substantially 30 grams, and more preferably substantially 10 grams to substantially 20 grams and more preferably 15 grams.

Accordingly, example embodiments of the invention can provide the technical effects of creating certain systems and methods that provide an improved way to remove a buffer jacket outer layer from a coated optical fiber by pulling the coated optical fiber through the wall of the buffer jacket outer layer and tearing the buffer jacket outer layer along the longitudinal axis of the buffer jacket outer layer to a desired bare coated optical fiber distance. Example embodiments disclosed herein can provide the further technical effects of providing a tight-buffered optical fiber cable that does not include a gel or lubricant between the coated optical fiber (e.g., the outer surface of the secondary coating layer or outer surface of the ink layer) and the buffer jacket outer layer and does not include an air gap between the coated optical fiber (e.g., the outer surface of the secondary coating layer or outer surface of the ink layer) and the buffer jacket outer layer, yet still provides an improved method for removing the buffer jacket outer layer from the coated optical fiber. These embodiments can provide the technical effect of producing a tight-buffered optical fiber that can have the buffer jacket outer layer removed without having to further remove greasy or messy residue from lubricant or wet-filling compound disposed between the coated optical fiber and the buffer jacket outer layer.

As desired, embodiments of the disclosure may include the optical fiber cable 300, the coating system 400, the method of manufacture 500, the method of use 600, and the method and system for peel force testing the tight-buffered optical fiber cable 700 as illustrated and described in FIGS. 3-7.

The example embodiments disclosed herein are described above with reference to block and flow diagrams of systems, methods, and/or apparatuses, according to example embodiments of the invention. It will be understood that one or more blocks of the block diagrams and flow diagrams, and combinations of blocks in the block diagrams and flow diagrams may not necessarily need to be performed in the order presented, or may not necessarily need to be performed at all, according to some embodiments of the invention.

While the example embodiments have been described in connection with what is presently considered to be the most practical and various embodiments, it is to be understood that the inventive concepts are not to be limited to the example embodiments disclosed. On the contrary, this disclosure is intended to cover various modifications and equivalent arrangements included within the scope of the appended claims. Although specific terms are employed herein, they are used in a generic and descriptive sense only and not for purposes of limitation.

What is claimed is:

1. A buffered optical fiber comprising:
    an optical fiber comprising:
        a glass core;
        a cladding layer surrounding the glass core;
        at least one coating layer surrounding the cladding layer, wherein the glass core, the cladding layer, and the at least one coating layer collectively comprise a coated optical fiber; and
    a buffer jacket outer layer disposed directly against and surrounding an outer surface of the coated optical fiber to comprise a tight-buffered optical fiber, wherein the buffer jacket outer layer comprises a smooth outer surface, an elastic modulus in the range of 20 MPa to 90 MPa, an elongation percentage in the range of substantially 20 percent to substantially 80 percent, and tensile strength in the range of substantially 1 MPa to substantially 15 MPa;
    wherein the buffer jacket outer layer comprises an outer wall of the buffered optical fiber and wherein the coated optical fiber is configured to be torn through the outer wall of the buffer jacket outer layer.

2. The buffered optical fiber of claim 1, wherein the buffer jacket outer layer is constructed of a buffer jacket material comprising polyurethane acrylate.

3. The buffered optical fiber of claim 1, wherein the coated optical fiber is configured to be torn through the outer wall of the buffer jacket outer layer with a peeling force in the range of substantially 5 grams to substantially 50 grams.

4. The buffered optical fiber of claim 1, wherein the buffer jacket outer layer comprises an elongation percentage in a range of substantially 40 percent to substantially 60 percent and an elastic modulus in a range of substantially 50 MPa to substantially 70 MPa.

5. The buffered optical fiber of claim 1, wherein the buffer jacket outer layer comprises an elongation percentage in a range of substantially 45 percent to substantially 55 percent.

6. A buffered optical fiber comprising:
    an optical fiber comprising:
        a glass core;
        a cladding layer surrounding the glass core; and
        at least one coating layer surrounding the cladding layer, wherein the glass core, the cladding layer, and the at least one coating layer collectively comprise a coated optical fiber; and
    a buffer jacket outer layer disposed directly against and surrounding an outer surface of the coated optical fiber to comprise a tight-buffered optical fiber, wherein the buffer jacket outer layer comprises a smooth outer surface, a tensile strength in the range of substantially 1 MPa to substantially 15 MPa, an elongation percentage in the range of substantially 20 percent to substantially 80 percent, and an elastic modulus in the range of substantially 30 MPa to substantially 80 MPa;

wherein the buffer jacket outer layer comprises an outer wall of the buffered optical fiber and wherein the coated optical fiber is configured to be torn through the outer wall of the buffer jacket outer layer.

7. The buffered optical fiber of claim 6, wherein the tensile strength for the buffer jacket outer layer is substantially 6 MPA.

8. The buffered optical fiber of claim 6, wherein the coated optical fiber is configured to be torn through the buffer jacket outer layer with a peeling force in the range of substantially 5 grams to substantially 50 grams.

\* \* \* \* \*